US010728435B2

(12) United States Patent
Rendlen

(10) Patent No.: US 10,728,435 B2
(45) Date of Patent: Jul. 28, 2020

(54) IMAGE CAPTURE DEVICE WITH FLEXIBLE CIRCUIT BOARD

(71) Applicant: SHOPPERTRAK RCT CORPORATION, Chicago, IL (US)

(72) Inventor: Jeffrey R. Rendlen, Chicago, IL (US)

(73) Assignee: SHOPPERTRAK RCT CORPORATION, Chicago, IL (US)

( * ) Notice: Subject to any disclaimer, the term of this patent is extended or adjusted under 35 U.S.C. 154(b) by 80 days.

(21) Appl. No.: 15/812,839

(22) Filed: Nov. 14, 2017

(65) Prior Publication Data

US 2018/0376123 A1 Dec. 27, 2018

Related U.S. Application Data

(60) Provisional application No. 62/524,045, filed on Jun. 23, 2017.

(51) Int. Cl.
*H04N 5/225* (2006.01)
*H04N 13/239* (2018.01)

(52) U.S. Cl.
CPC ......... *H04N 5/2258* (2013.01); *H04N 5/2252* (2013.01); *H04N 5/2253* (2013.01); *H04N 5/2257* (2013.01); *H04N 5/22521* (2018.08); *H04N 13/239* (2018.05); *H04N 2213/001* (2013.01)

(58) Field of Classification Search
CPC ............... H04N 5/2251; H04N 5/2252; H04N 5/22521; H04N 5/2253; H04N 5/2257; H04N 5/2258; H04N 13/239; H04N 2213/001
See application file for complete search history.

(56) References Cited

U.S. PATENT DOCUMENTS

| | | | | |
|---|---|---|---|---|
| 4,741,327 | A | 5/1988 | Yabe | |
| 5,381,784 | A | 1/1995 | Adair | |
| 6,083,353 | A | 7/2000 | Alexander | |
| 6,392,688 | B1 * | 5/2002 | Barman | H04N 13/239 348/42 |
| 6,811,330 | B1 | 11/2004 | Tozawa | |
| 6,950,312 | B2 | 9/2005 | Staiger | |
| 8,081,207 | B2 | 12/2011 | Barman | |
| 8,124,929 | B2 | 2/2012 | Olsen et al. | |
| 8,500,630 | B2 | 8/2013 | Gilad et al. | |
| 8,516,691 | B2 | 8/2013 | Gilad et al. | |
| 8,743,176 | B2 | 6/2014 | Stettner et al. | |

(Continued)

FOREIGN PATENT DOCUMENTS

WO WO 2013/096895 6/2013

OTHER PUBLICATIONS

Andwin Circuits, "Rigid Flex PCB (Printed Circuit Boards)," access on the Internet at: http://www.andwinpcb.com/rigid-flex-pcb/ (Mar. 1, 2017).

(Continued)

*Primary Examiner* — Daniel M Pasiewicz
(74) *Attorney, Agent, or Firm* — Arent Fox, LLP

(57) ABSTRACT

An image capture device in accordance with the present disclosure includes a cover coupled to a mount to surround a stereoscopic-camera unit. The stereoscopic-camera unit includes a circuit board coupled to a frame. A floating board-section of the circuit board accommodates expansion and contraction of the frame.

17 Claims, 4 Drawing Sheets

(56) References Cited

U.S. PATENT DOCUMENTS

2007/0258006 A1 11/2007 Olsen et al.
2007/0296846 A1 12/2007 Barman et al.
2008/0173792 A1 7/2008 Yang
2011/0003622 A1 1/2011 Hwang
2012/0081550 A1* 4/2012 Sewell ................. H04N 5/2251 348/148
2013/0033581 A1* 2/2013 Woo ..................... H04N 5/2257 348/47
2014/0316198 A1 10/2014 Krivopisk et al.
2015/0029313 A1 1/2015 Muller
2015/0077517 A1* 3/2015 Powers ................ H04N 5/2253 348/46
2015/0109422 A1 4/2015 Weiss
2015/0264232 A1 9/2015 Yang
2015/0381860 A1 12/2015 De Nardi et al.
2016/0037031 A1* 2/2016 Bull ..................... H04N 5/2253 348/374
2016/0255260 A1* 9/2016 Huang ................. H04N 5/2258 348/262
2016/0381262 A1* 12/2016 Shi ....................... H04N 5/2254 348/47
2018/0042106 A1 2/2018 Scheja

OTHER PUBLICATIONS

Flexible Circuit, "Flex Printed Circuits, Flexible Printed Circuit Boards," access on the Internet at: http://www.flexiblecircuit.com/product-category/flex-printed/ (Apr. 26, 2017).

Schatzel, Reliability of Carbon Core Laminate Construction in Printed Circuit Boards Utilizing Stablcor™, Jet Propulsion Laboratory, California Institute of Technology, Pasadena, CA, JPL Publication 09-37 (Dec. 2009).

* cited by examiner

IMAGE CAPTURE DEVICE WITH FLEXIBLE CIRCUIT BOARD

PRIORITY CLAIM

This application claims priority under 35 U.S.C. § 119(e) to U.S. Provisional Application Ser. No. 62/524,045, filed Jun. 23, 2017, which is expressly incorporated by reference herein.

BACKGROUND

The present disclosure relates to an image capture device, and particularly to a stereoscopic camera. More particularly, the present disclosure relates to a stereoscopic-camera unit having a circuit board attached to a frame for mounting the stereoscopic-camera unit relative to a structure.

SUMMARY

An image capture device in accordance with the present disclosure includes a cover coupled to a mount to surround a stereoscopic-camera unit. The stereoscopic-camera unit includes a circuit board coupled to a frame.

In illustrative embodiments, the circuit board includes image board-sections coupled to opposing ends of a floating board-section by flexible interconnects. Image sensors are coupled to the image board-sections. The image board-sections are secured to the frame, and the floating board section extends along the frame and is configured to move relative to the frame without being secured thereto. Flexible interconnects are substantially flexible to allow expansion or contraction in a length thereof with expansion or contraction in the frame.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
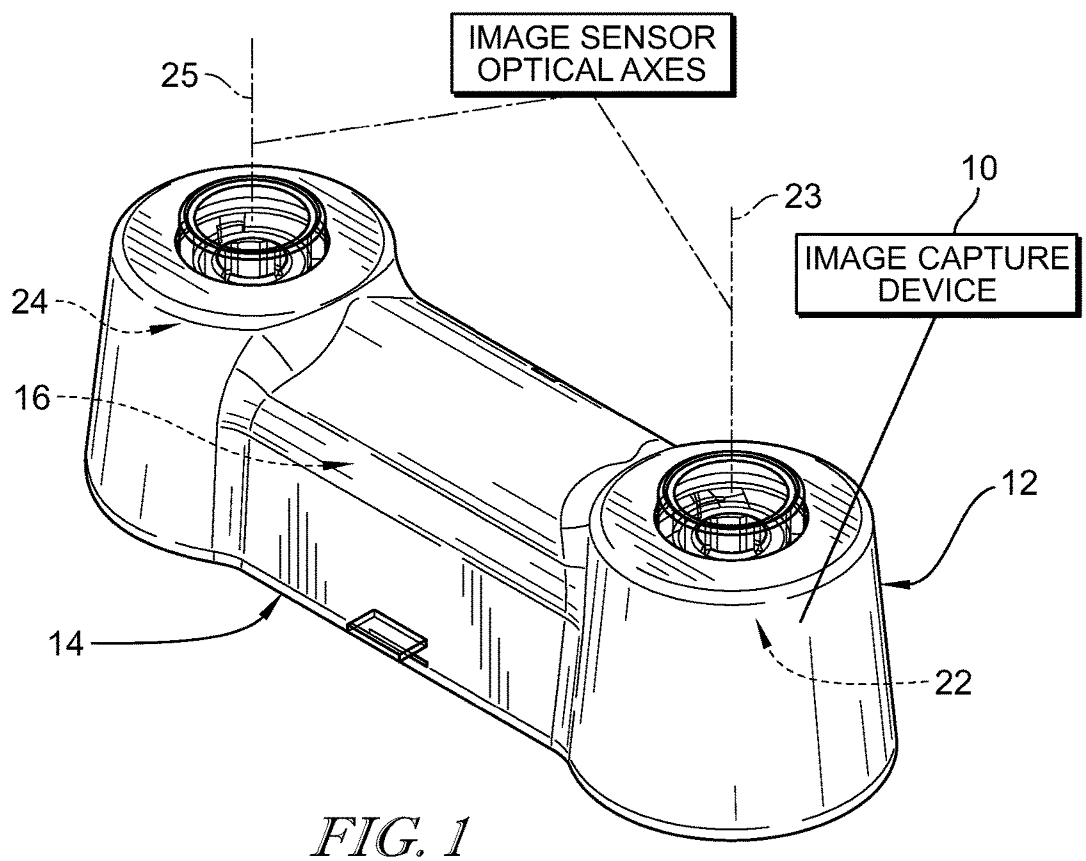
FIG. 1 is a perspective view of an image capture device in accordance with the present disclosure showing that the image capture device includes a pair of image sensors having optical axes that are spaced apart and aligned in a common direction.

An image capture unit 10 in accordance with the present disclosure is shown in FIG. 1. Image capture unit 10 includes a cover 12 coupled to a mount 14 to surround a stereoscopic-camera unit 16. Image sensors 22, 24 of stereoscopic-camera unit 16 have optical axes 23, 25 that are spaced apart and aligned in a common direction. Image capture unit 10 is configured to capture images using image sensors 22, 24 that can be processed to produce relative height measurements for distinguishing potential customers in a retail setting, for example.

Figure 2:
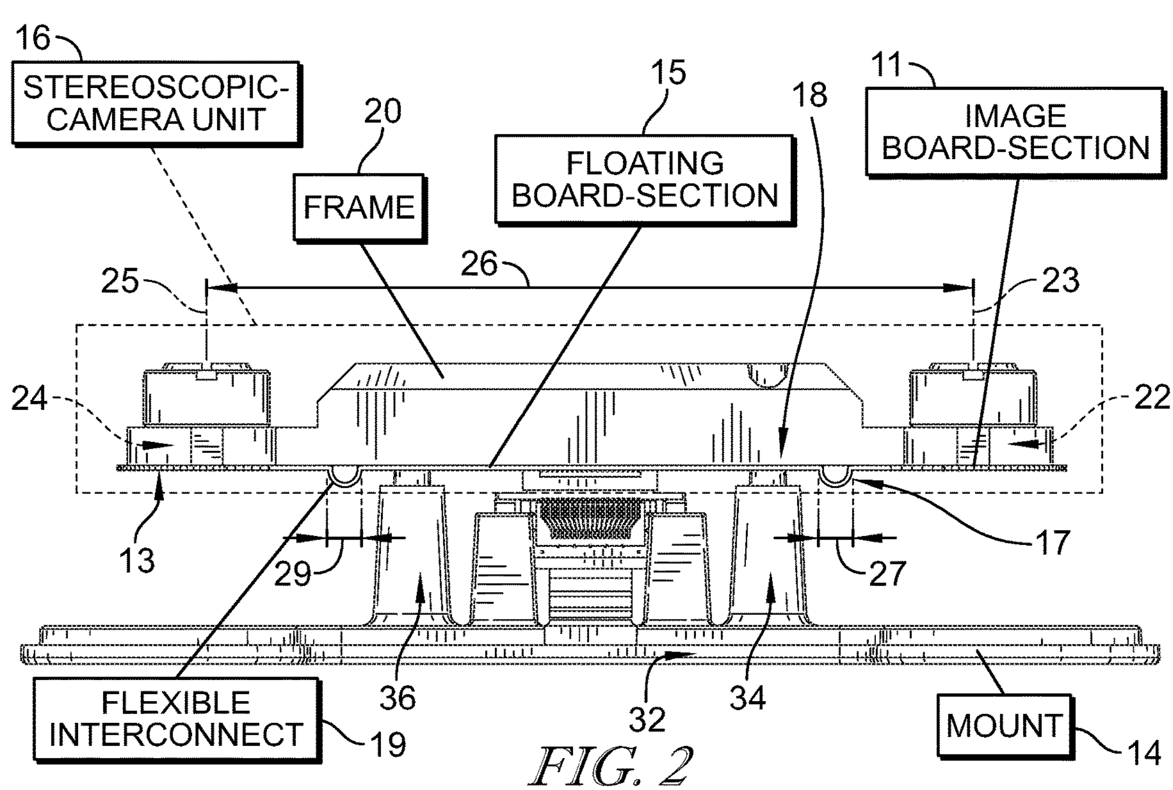
FIG. 2 is a side elevation view of a stereoscopic-camera unit in accordance with the present disclosure showing a circuit board of the stereoscopic-camera unit having a pair of image board-sections coupled to a floating board-section by flexible interconnects and suggesting that the image board-sections are attached to a frame to move with the frame and that the flexible interconnects, which are not attached to the frame, expand and contract in response to variations in a distance between the image sensor optical axes.

Stereoscopic-camera unit 16 includes a circuit board 18 coupled to a frame 20 as shown in FIG. 2. Circuit board 18 includes image board-sections 11, 13 coupled to opposing ends of a floating board-section 15 by flexible interconnects 17, 19 (sometimes called a flex circuit), respectively. Image sensors 22, 24 are coupled to image board-sections 11, 13, respectively, and optical axes 23, 25 are spaced apart by a distance 26. Image board-sections 11, 13 are secured to frame 20 and substantially fixed in position relative to frame 20. Floating board section 15 extends along frame 20, without being attached thereto, and is configured to move relative to frame 20.

Variations in distance 26 can occur, for example, due to temperature variations of a surrounding environment of image capture device 10 causing expansion or contraction of frame 20 as suggested in FIG. 2. Image board-sections 11, 13 move with frame 20. Flexible interconnects 17, 19 are substantially flexible to allow expansion or contraction in a length 27, 29, respectively, with expansion or contraction in frame 20 to substantially isolate floating board-section 15 from movement of frame 20. In the illustrative embodiment, image board-sections 11, 13 and floating board-section 15 are formed as substantially rigid board segments and are aligned in a common plane. In some embodiments, image board-sections 11, 13 are aligned with one another and floating board-section 15 is offset from image board-sections 11, 13. In some embodiments, flexible interconnects 17, 19 are formed as a flattened ribbon cable, such as electrically conductive wires bonded to a dielectric film.

Figure 3:
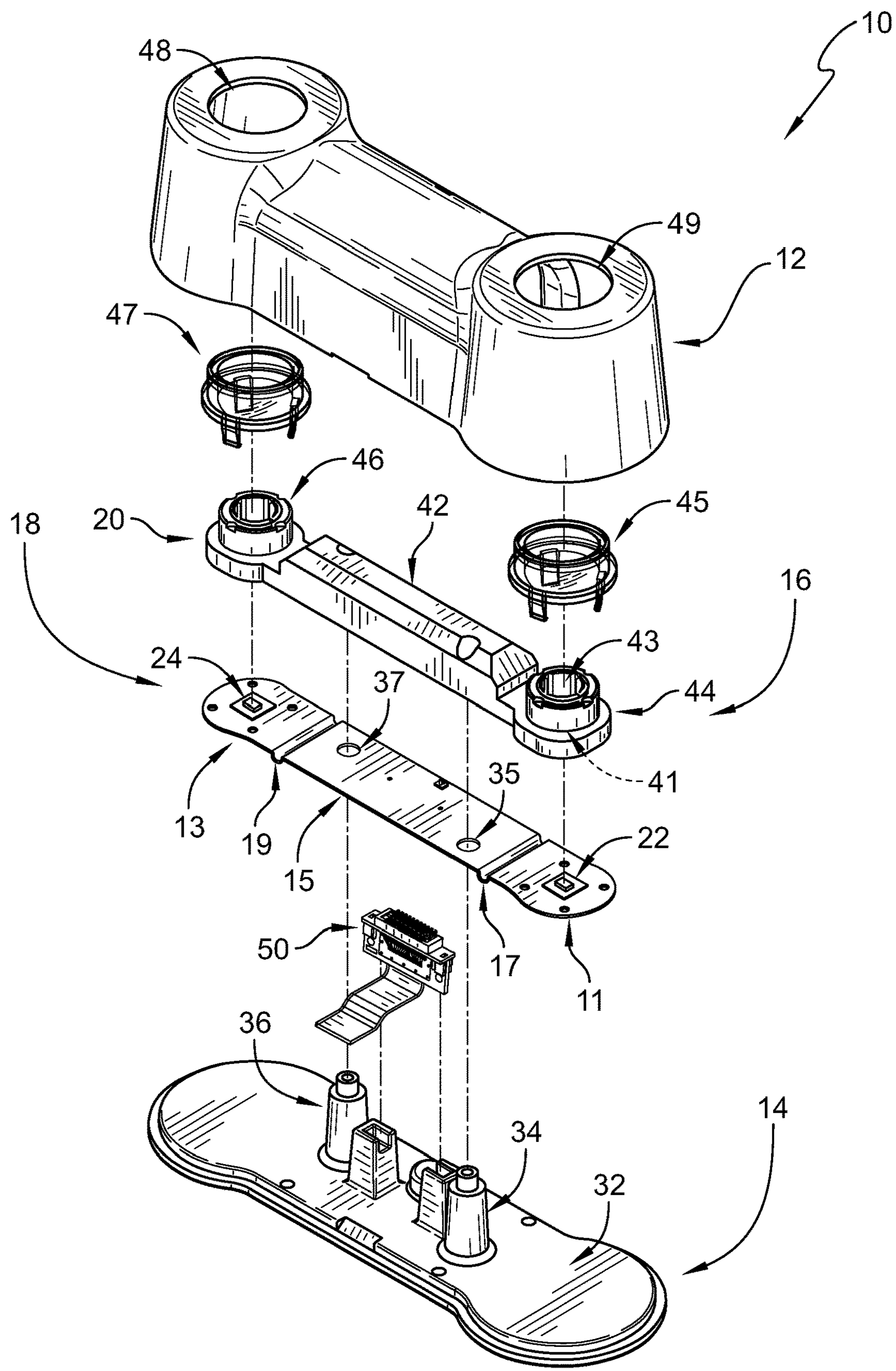
FIG. 3 is an upper perspective exploded assembly view of the image capture device of FIG. 1 showing that the cover is arranged to couple with the mount to surround the stereoscopic-camera unit and suggesting that stakes of the mount pass through the circuit board to engage with the frame.
Figure 4:
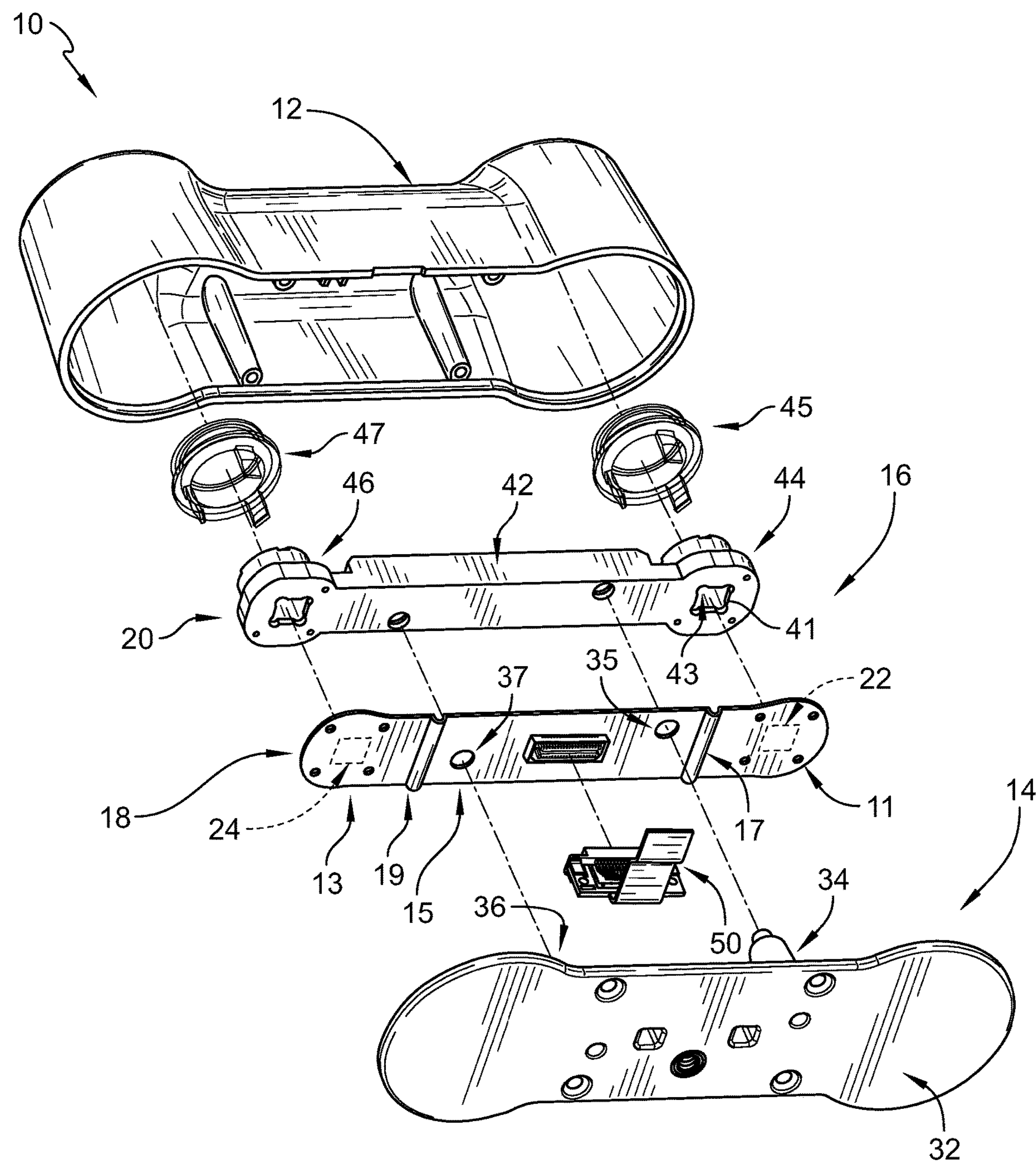
FIG. 4 is a lower perspective exploded assembly view of the image capture device of FIG. 1 showing that the image sensors are aligned with recesses of the frame and suggesting that fasteners engage with the image board-sections and the frame to maintain alignment of the image sensors with the recesses.
Figure 5:
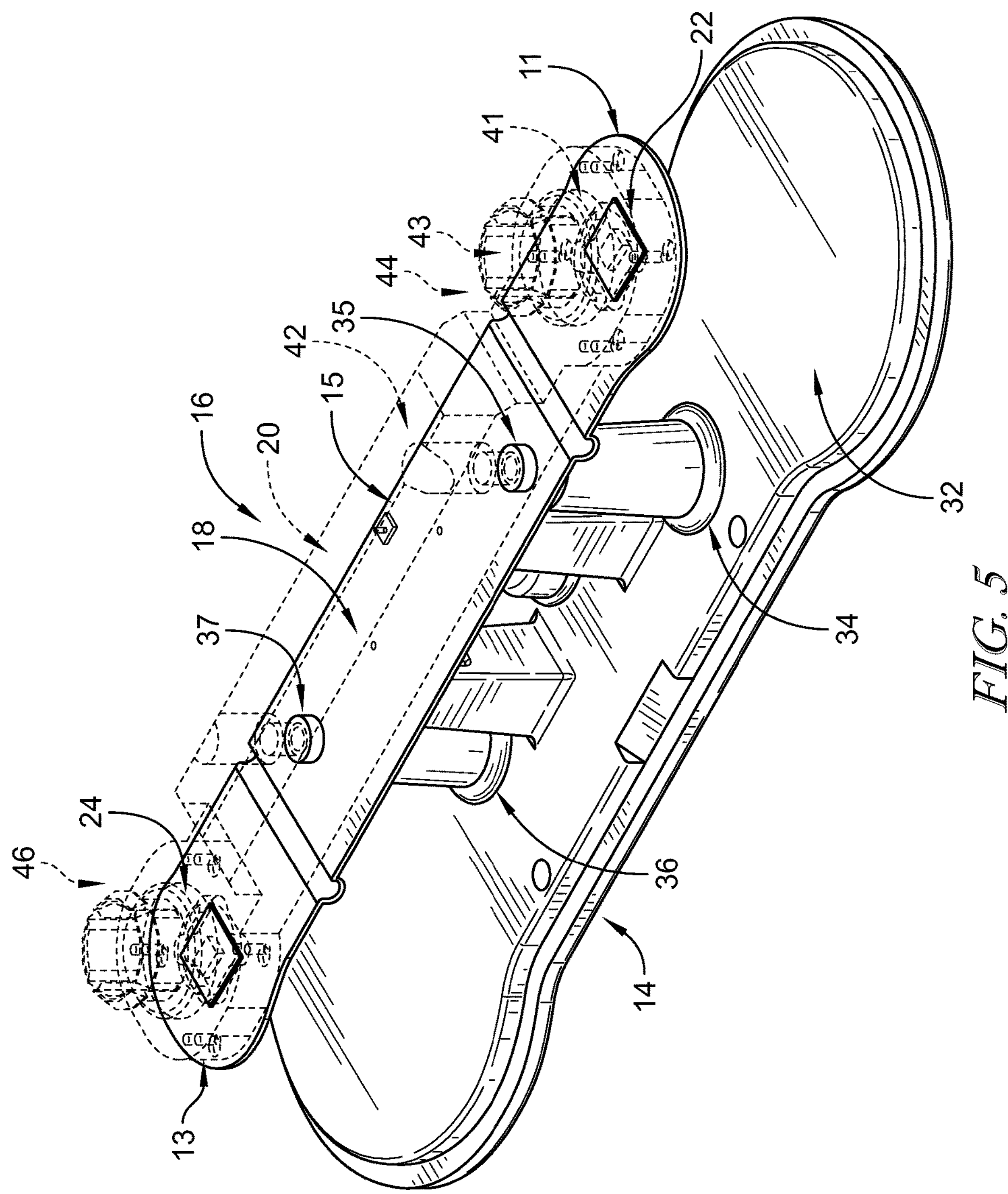
FIG. 5 is a perspective view of the image capture device of FIG. 1 with the cover removed and frame displayed in phantom to show the circuit board aligned with and supported by the frame and suggesting that the frame is supported by the mount for mounting the stereoscopic-camera unit relative to a structure.

Mount 14 includes a base 32 and a pair of stakes 34, 36 extending outward from base 32 as shown in FIGS. 3 and 4. Stakes 34, 36 extend through openings or holes 35, 37, respectively, of floating board-section 15 to engage with frame 20 to support frame 20 relative to base 32 as suggested in FIG. 5. In some embodiments, fasteners engage with frame 20 and stakes 34, 36 to hold frame 20 on mount 14. Frame 20 supports circuit board 18 relative to base 32. Stakes 34, 36 cooperate with frame 20 to further isolate the movement of frame 20 from floating board-section 15. In some embodiments, holes 35, 37 can be sized to minimize or eliminate contact of floating board-section 15 from stakes 34, 36. Base 32 is configured to attach image capture device 10 to a structure, such as a wall or ceiling of a building for example, using fasteners or other securing means.

Frame 20 includes a body 42 and grips 44, 46 extending from opposing ends of body 42 as shown in FIGS. 3 and 4. In some embodiments, grips are separate and fastened to body 42. Each grip 44, 46 is formed to define a recess 41 and to include an aperture 43 extending through each grip 44, 46. In the illustrative embodiment, apertures 43 are aligned with recesses 41. Recesses 41 are sized to receive one of image sensors 22, 24 as suggested in FIG. 5. Image board-sections 11, 13 are coupled to grips 44, 46, respectively, using fasteners for example, as suggested in FIG. 4. Protective caps 45, 47 engage with grips 44, 46, respectively, to block entry of contaminants into apertures 43. Caps 45, 47 fit through windows 48, 49 of cover 12 such that image sensors 22, 24 align with windows 48, 49 as suggested in FIGS. 1 and 3. In some embodiments, caps 45, 47 may be configured to act as lenses for image sensors 22, 24.

A connector 50 engages with circuit board 18 to transmit images captured by image sensors 22, 24 to a location remote from image capture device 10 for storage or other processing as suggested in FIGS. 3 and 4. In some embodiments, a wireless transmitter may be used in place of or in combination with connector 50. Image capture device 10 can be powered through connector 50 or another other power source, such as one or more batteries or a separate power adapter.

In some embodiments, frame 20 is formed from a rigid material, such as metal or metal alloy, that has a different coefficient of thermal expansion from circuit board 18. Frame 20 provides stability and maintains alignment of optical axis 23, 25. Flexible interconnects 17, 19 can minimize or eliminate negative effects of relative thermal expansion between frame 20 and circuit board 18. For example, a circuit board without flexible interconnects 17, 19 attached to frame 20, having a different coefficient of thermal expansion from the circuit board, can force the circuit board to expand beyond a threshold of elastic deformation from increases in temperature and in some instances can cause permanent elongation of the circuit board with repeated expansion and contraction cycles during variations in temperature. Deformation of the circuit board can cause misalignment of the optical axis of the image sensors and negatively affect the accuracy of images captured by the image sensors. Flexible interconnects 17, 19 allow expansion and contraction of circuit board 18 while minimizing or eliminating the effect of expansion and contraction of board-sections 11, 13, 15.

In illustrative embodiments, image capture unit 10 can be electronically or wirelessly linked to a counting system for monitoring consumer traffic patterns at facilities such as malls or stores. Image capture unit 10 is mounted above an entrance or entrances to a facility for capturing images from the entrance or entrances. The area captured by the image capture unit 10 is a field of view, and images captured by image capture unit 10 are transmitted to the counting system with the time when the image is captured.

The spaced apart image sensors 22, 24 allow image capture unit 10 to simulate human binocular vision. A pair of stereo images includes an image taken by each image sensor 22, 24, and a height map is constructed from the pair of stereo images through computations involving finding corresponding pixels. Object detection is a process of locating candidate objects in the height map. Because human objects of interest are much higher than the ground, local maxima of the height map often represent heads of human objects and can be used for counting human traffic. Further discussion on capturing and counting traffic data can be found, for example, in U.S. Pat. No. 8,472,672, which is expressly incorporate by reference herein.

In illustrative embodiments, a flex circuit is used to produce a floating central board while two outer fixed rigid sections move with a frame (sometimes called a bar lens holder). The frame may be made of aluminum.

In illustrative embodiments, the fixed sections move with the frame to maintain an optical center during fluctuations in temperature. The frame may be mounted on posts of a mount that fit inside holes of the floating central board with adequate clearance so the floating board does not touch the posts.

The invention claimed is:

1. A stereoscopic-camera unit comprising a frame;

a circuit board having a floating board-section positioned to lie along the frame without being attached thereto, a first image board-section coupled to an end of the floating board-section, and a second image board-section coupled to an opposing end of the floating board-section from the first image board-section, and a mount comprising a base and a stake, the stake extending from the base through an opening of the floating board-section and engaging with the frame so that the base is spaced apart from the circuit board, wherein the first image board-section and the second image board-section are fixed in relation to the frame, and the floating board-section is configured to move relative to the first image board-section and the second image board-section and relative to the frame.

2. The stereoscopic camera unit of claim 1, wherein the opening is sized such that the floating board-section does not contact the stake during movement of the floating board-section.

3. The stereoscopic camera unit of claim 1, further comprising a cover coupled to the base of the mount to substantially enclose the frame and circuit board within the cover.

4. The stereoscopic camera unit of claim 1, wherein the floating board-section, the first image board-section, and the second image board-section of the circuit board are substantially rigid.

5. The stereoscopic camera unit of claim 4, further comprising a first flexible interconnect coupled between the first image board-section and the floating board-section and a second flexible interconnect coupled between the second image board-section and the floating board-section, and wherein the first flexible interconnect and the second flexible interconnect are substantially flexible to allow the floating board-section to move relative to the first image board-section and the second image board-section.

6. The stereoscopic camera unit of claim 5, wherein the first flexible interconnect and the second flexible interconnect are each formed as a flattened ribbon cable.

7. The stereoscopic camera unit of claim 1, further comprising a first image sensor coupled to the first image board-section of the circuit board and a second image sensor coupled to the second image board-section of the circuit board.

8. The stereoscopic camera unit of claim 7, wherein the first image sensor and the second image sensor are aligned with respective apertures extending through the frame.

9. The stereoscopic camera unit of claim 8, further comprising lenses coupled to the frame and aligned with the apertures.

10. The stereoscopic camera unit of claim 1, wherein the floating board-section is generally aligned with the first and second image board-sections.

11. The stereoscopic camera unit of claim 10, wherein the floating board-section is generally co-planar with the first and second image board-sections.

12. The stereoscopic camera unit of claim 1, wherein the frame is formed from a metal or metal alloy material.

13. The stereoscopic camera unit of claim 12, wherein the frame is formed from aluminum.

14. An image capture device comprising:

a cover having windows extending therethrough;

a mount having a base and a stake extending from the base; and a stereoscopic-camera unit comprising:

a frame coupled to the stake of the mount;

a circuit board having a floating board-section positioned to lie along the frame without being attached thereto, a first image board-section coupled to an end of the floating board-section, and a second image board-section coupled to an opposing end of the floating board-section from the first image board-section; and a first image sensor coupled to the first image board-section of the circuit board and a second image sensor coupled to the second image board-section of the circuit board, wherein, the first image board-section and the second image board-section are fixed in relation to the frame, the floating board-section is configured to move relative to the first image board-section and the second image board-section and relative to the frame, the cover is coupled to the base of the mount to substantially enclose the frame and circuit board within the cover and align each window of the cover with one of the first or second image sensors, and the stake is configured to extend through an opening of the floating board-section to engage with the frame so that the base is spaced apart from the circuit board, and wherein the opening is sized such that the floating board-section does not contact the stake during movement of the floating board-section.

15. The stereoscopic camera unit of claim 14, further comprising a first flexible interconnect coupled between the first image board-section and the floating board-section and a second flexible interconnect coupled between the second image board-section and the floating board-section, wherein the first flexible interconnect and the second flexible interconnect are substantially flexible to allow the floating board-section to move relative to the first image board-section and the second image board-section, and wherein the floating board-section, the first image board-section, and the second image board-section of the circuit board are substantially rigid.

16. The stereoscopic camera unit of claim 14, further comprising lenses, wherein the frame is formed to include apertures extending through the frame, wherein the first image sensor and the second image sensor are each aligned with one of the apertures, and wherein the lenses are coupled to the frame and each aligned with one of the apertures.

17. An image capture device comprising:

a cover having windows extending therethrough;

a mount having a base and a stake extending from the base; and a stereoscopic-camera unit comprising:

a frame coupled to the stake of the mount;

a circuit board having a floating board-section positioned to lie along the frame without being attached thereto, a first image board-section coupled to an end of the floating board-section by a first flexible interconnect, and a second image board-section coupled to an opposing end of the floating board-section from the first image board-section by a second flexible interconnect; and a first image sensor coupled to the first image board-section of the circuit board and a second image sensor coupled to the second image board-section of the circuit board, wherein;

the first image board-section and the second image board-section are fixed in relation to the frame, the floating board-section is configured to move relative to the first image board-section and the second image board-section and relative to the frame, the cover is coupled to the base of the mount to substantially enclose the frame and circuit board within the cover and align each window of the cover with one of the first or second image sensors, the frame has a different coefficient of thermal expansion from and the first image board-section, the second image board-section, and the floating board-section, and the stake is configured to extend through an opening of the floating board-section to engage with the frame so that the base is spaced apart from the circuit board, and wherein the opening is sized such that the floating board-section does not contact the stake during movement of the floating board-section.

* * * * *

UNITED STATES PATENT AND TRADEMARK OFFICE

CERTIFICATE OF CORRECTION

PATENT NO. : 10,728,435 B2
APPLICATION NO. : 15/812839
DATED : July 28, 2020
INVENTOR(S) : Jeffrey R. Rendlen It is certified that error appears in the above-identified patent and that said Letters Patent is hereby corrected as shown below:

In the Specification
In Column 4, Line 2, delete "incorporate" and insert -- incorporated --, therefor.

In the Claims
In Column 4, Line 14, in Claim 1, delete "comprising" and insert -- comprising: --, therefor.
In Column 4, Line 21, in Claim 1, delete "board-section," and insert -- board-section; --, therefor.
In Column 5, Line 24, in Claim 14, delete "wherein," and insert -- wherein: --, therefor.
In Column 6, Line 28, in Claim 17, delete "wherein;" and insert -- wherein: --, therefor.

Signed and Sealed this
Eighth Day of December, 2020

Andrei Iancu
*Director of the United States Patent and Trademark Office*